(12) United States Patent
Ding et al.

(10) Patent No.: US 7,760,456 B2
(45) Date of Patent: Jul. 20, 2010

(54) DATA PROTECTION BASED ON SYSTEM VIBRATION MODES

(75) Inventors: Mingzhong Ding, Singapore (SG); Jianyi Wang, Singapore (SG); JianGuo Zhou, Singapore (SG); KianKeong Ooi, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 329 days.

(21) Appl. No.: 11/941,260

(22) Filed: Nov. 16, 2007

(65) Prior Publication Data

US 2009/0128945 A1   May 21, 2009

(51) Int. Cl.
G11B 19/04   (2006.01)

(52) U.S. Cl. ....................................................... 360/60

(58) Field of Classification Search ................... 360/60, 360/75, 69, 78.12; 710/5; 714/769; 726/17
See application file for complete search history.

(56) References Cited

U.S. PATENT DOCUMENTS

| | | | |
|---|---|---|---|
| 5,041,924 A * | 8/1991 | Blackborow et al. ......... 360/69 |
| 5,065,262 A * | 11/1991 | Blackborow et al. ......... 360/75 |
| 5,253,129 A * | 10/1993 | Blackborow et al. ......... 360/69 |
| 5,287,468 A * | 2/1994 | Furuhashi et al. ............. 710/5 |
| 5,426,545 A | 6/1995 | Sidman et al. ........... 360/78.09 |
| 5,548,599 A * | 8/1996 | Furuhashi et al. ........... 714/769 |
| 5,956,194 A * | 9/1999 | Ohmi et al. ................... 360/60 |
| 6,012,145 A * | 1/2000 | Mathers et al. ............... 726/17 |
| 6,178,058 B1 | 1/2001 | Pan et al. ...................... 360/60 |
| 6,212,026 B1 * | 4/2001 | Ohmi et al. ................... 360/60 |
| 6,429,990 B2 | 8/2002 | Serrano et al. ............... 360/60 |
| 6,496,324 B1 * | 12/2002 | Golowka et al. ......... 360/78.12 |
| 6,498,698 B1 * | 12/2002 | Golowka et al. ......... 360/78.12 |
| 6,538,839 B1 | 3/2003 | Ryan ........................ 360/77.02 |
| 6,567,233 B1 | 5/2003 | Chew et al. .............. 360/77.05 |
| 6,633,454 B1 | 10/2003 | Martin et al. ............... 360/132 |
| 6,914,743 B1 | 7/2005 | Narayana et al. ......... 360/77.08 |
| 7,027,255 B2 | 4/2006 | Schmidt .................. 360/77.08 |
| 7,154,690 B1 | 12/2006 | Brunnett et al. .............. 360/60 |
| 7,177,113 B1 | 2/2007 | Semba et al. ............ 360/77.07 |
| 2007/0159710 A1 * | 7/2007 | Lucas et al. ................... 360/75 |
| 2007/0242386 A1 | 10/2007 | Finamore et al. |
| 2007/0253087 A1 * | 11/2007 | Lee .............................. 360/69 |

* cited by examiner

*Primary Examiner*—Fred Tzeng
(74) *Attorney, Agent, or Firm*—Christopher J. Volkmann; Westman, Champlin & Kelly, P.A.

(57) ABSTRACT

An aspect of the present disclosure relates to implementing a data protection mode based on system vibration modes in a data supported system. An exemplary system vibration mode is associated with an operating mode of the data supported system. The data protection mode operates to limit, or prevent, errors caused by the vibration. In one exemplary embodiment, a method is provided for operating a data supported system. The method includes receiving an indication that a vibration associated with an operating mode of the system will occur and, in response, implementing a data protection mode in the system.

20 Claims, 6 Drawing Sheets

DATA PROTECTION BASED ON SYSTEM VIBRATION MODES

BACKGROUND

The present disclosure relates generally to systems configured to process, access and/or communicate data, and more specifically, but not by limitation, to systems susceptible to disruption in data due to vibration modes.

Data supported systems, such as phones, video recorders, video players, stereo systems, media systems, computing systems, data communication systems, data access systems, and automotive systems, are exposed to various sources of vibration. Such sources of vibration subject electronic components within the systems to shock and vibrations. These shocks and vibrations can cause disruption of the data supported systems.

For example, a digital communication system having a data storage component can be susceptible to errors and/or failure due to disturbances such as vibration and/or shock. These disturbances can be caused by an operating mode associated with a component or application within the digital communication system. For instance, a speaker, ringer, or vibrator, for example, activated within the system can include a source of vibration that can adversely affect read and/or write performance of the data storage component.

The discussion above is merely provided for general background information and is not intended to be used as an aid in determining the scope of the claimed subject matter.

SUMMARY

An aspect of the present disclosure relates to implementing a data protection mode based on system vibration modes in a data supported system. An exemplary system vibration mode is associated with an operating mode of the data supported system. The data protection mode operates to limit, or prevent, errors caused by the vibration.

One exemplary aspect relates to a method of operating a data supported system, which includes receiving an indication that a vibration associated with an operating mode of the data supported system will occur. The method further includes implementing, in response to the indication, a data protection mode in the data supported system during the vibration.

Another exemplary aspect relates to a system, which includes a host device and a data channel communicatively coupled with the host device. The host device is configured to transmit an indication to the data channel that a vibration associated with an operating mode of the system will occur. The data channel is configured to implement, in response to the indication, a protection mode during the vibration.

Another exemplary aspect relates to a portable electronic device, which includes a data storage device having a storage medium configured to store data and a processor configured to activate a component in the electronic device having a source of vibration. The device also includes a controller configured to control data operations within the data storage device. The controller is configured to receive from the processor an indication that a vibration within the portable electronic device will occur and, in response, implement a control mechanism associated with the data storage device during the vibration.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Figure 1:
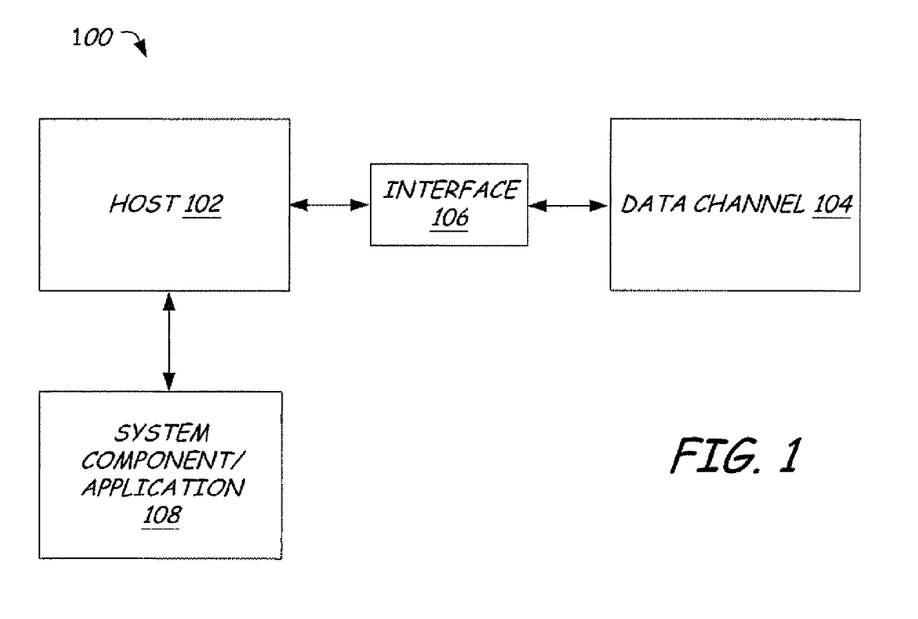
FIG. 1 is a schematic diagram of a data supported system.

FIG. 1 is a schematic diagram of a data supported system 100 including a host 102 and a data channel 104. Data supported system 100 is a type of system configured to process, access, and/or communicate data such as, but not limited to, computing systems, stereo systems, media systems, computer gaming systems, portable gaming systems, data storage systems, data transmission systems, data access systems, and automotive systems. Data supported system 100 is, in one embodiment, a data communication system configured to communicate data between components within system 100 and/or communicate data with components remote to system 100. For example, system 100 can be a system having an integrated data storage device.

Host 102 is a device, component, and/or subsystem of data supported system 100 and is configured to communicate with data channel 104. For example, in one embodiment host 102 includes a processor configured to control various data operations and applications within system 100. Data channel 104 is communicatively coupled to host 102 and is configured to transmit, receive, access, process, and/or store data. For example, data channel 104 can comprise one or more devices, components, applications, and/or subsystems such as, but not limited to, a transmitter, receiver, data storage device, format conversion device, encoder (compressor), decoder (decompressor), buffer, multiplexor, or modulator.

In one embodiment, system 100 is configured to be utilized within an electronic device such as a computer, laptop, telephone, or portable electronic device. Examples of portable electronic devices include mobile phones, digital music players, personal data assistants (PDAs), cameras, camcorders, and global positioning system (GPS) receivers, to name a few.

In many of the above-mentioned environments, system 100, and components and devices within system 100, are subjected to vibrations and shocks that can disrupt data operations. Some of these vibrations produced within system 100 can be caused by operational modes that produce vibrations within system 100. For example, a system vibration mode generates a vibration in response to or as a result of an operating mode of system 100. Examples of operating modes within system 100 include activation and implementation of components, devices, and applications within system 100. For example, an operating mode of system 100 can include activating and/or implementing a component or device that includes a vibration source that is internal or physically attached to system 100 (for example an integrated component or application within system 100). The generated vibration can be in response to a command, condition and/or operating parameter associated with the operating mode of system 100. For instance, host 102 can be configured to send a command to implement (e.g., activate) a component and/or application 108 within system 100. Operation of component and/or application 108 within system 100 generates an internal vibration within system 100.

In the context of a mobile phone environment, a system vibration mode can include, for example, an operating mode wherein a speaker, a vibrator, or a ringer is activated in system 100 in response to an activation command from host 102, which causes vibration of system 100. In the context of a gaming, or portable gaming environment, a user interface can include a vibrator or speaker, for example, activated based on an interactive gaming application. In one example, a speaker provides audio feedback to a user. In another example, a hand-held user controller is provided and includes a vibrator for producing tactile feedback to the user. In this manner, the speaker and/or vibrator can cause vibration of system 100.

Further, in the context of an automotive computing environment, an automobile may switch to various operating modes such as four-wheel drive, city driving, off-road driving, music-playing, etc. These operating modes can cause vibration within system 100 and/or cause system 100 to be more susceptible to vibration. Further yet, in the context of a digital music player a speaker can be activated, for example, to emit "Hells Bells" by AC/DC at maximum amplitude.

These sources of vibration within system 100 can subject electronic devices and components, such as data channel 104, within data system 100 with shock and/or vibrations. Data channel 104 can be susceptible to errors and/or failure due to disturbances caused by vibration and/or shock. Examples of types of electronic devices that can be susceptible to errors caused by vibration include a data storage device, a data communication channel, a data transmitter, and a data receiver, to name a few.

Figure 2:
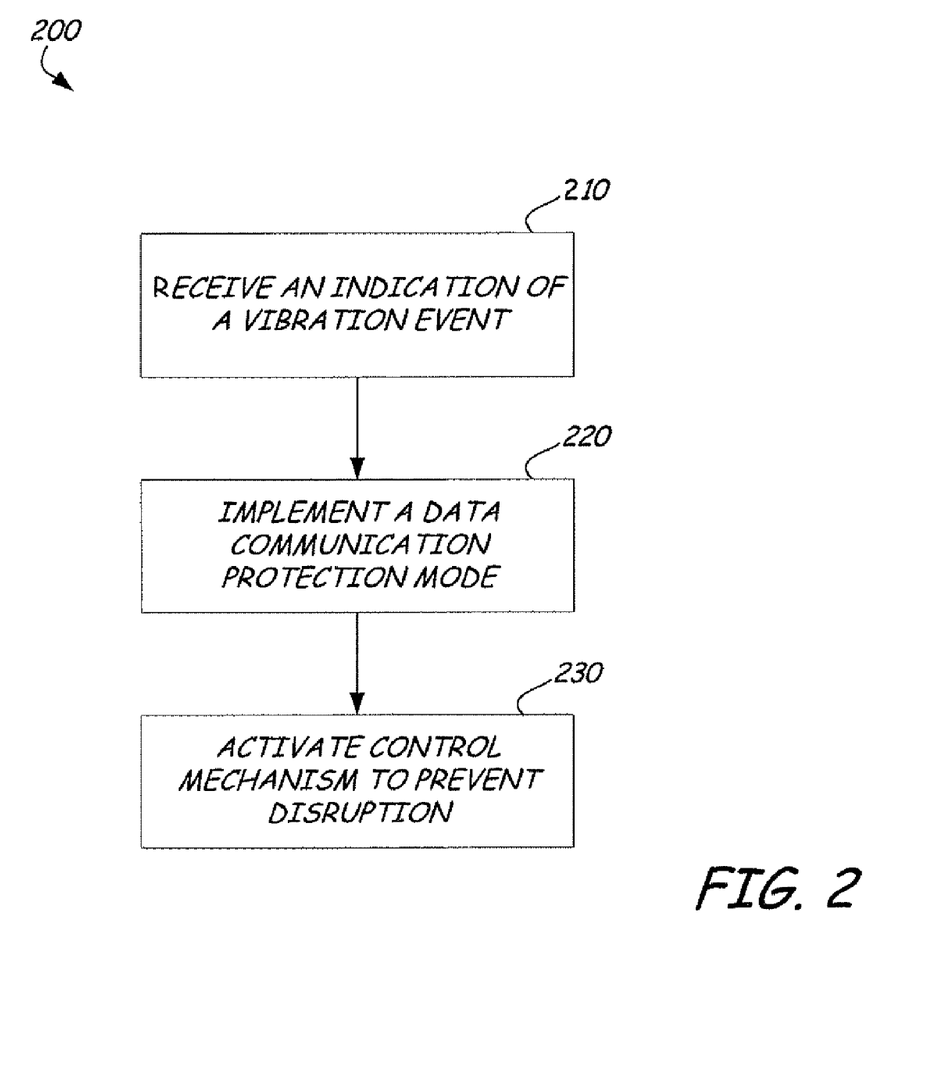
FIG. 2 is a flow diagram of a method for implementing a control mechanism in a data supported system.

In accordance with one exemplary embodiment, a method 200 illustrated in FIG. 2 is provided that can be utilized within system 100 to implement a data protection mode during a vibration event.

At step 210, an indication is received that a vibration event associated with an operating mode of system 100 will occur. As discussed above, an exemplary data supported system 100 includes a component and/or application 108 that includes a source of vibration. For example, host 102 can be configured to implement an operating mode in system 100 to activate component 108, such as a speaker, ringer, vibrator, that causes vibration within system 100. Further, host 102 can have knowledge of the vibration source such as a vibration type, vibration mode, vibration period, and vibration frequency associated with the vibration source. Host 102 generates the indication that a vibration event will occur and communicates to data channel 104, for example via interface 106. In one embodiment, the indication is provided to data channel 104 before occurrence of the vibration event.

In addition to the indication, host 102 can provide information regarding an impending vibration event to data channel 104. In one embodiment, information such as a vibration source, vibration type, vibration mode, vibration duration, and/or vibration frequency can be provided to data channel 104. For example, the information can include an indication of a frequency range or spectrum for the vibration event. The frequency range information can also include an indication of a time frame or duration for the indicated frequency range.

Further, the information can include a vibration event start time and a vibration event end time. The information can also include a vibration event duration time. In one embodiment, the information includes a vibration period. The vibration period can indicate whether the vibration is a continuous vibration or an intermittent vibration. Further, the vibration period can indicate whether the vibration is symmetric or asymmetric, and/ or whether the vibration will have a constant or varying amplitude. In one embodiment, the vibration period indicates that the entire indicated vibration event time duration will include a vibration or whether only one or more portions of the indicated time duration will include a vibration event.

In response to the received indication received at step 210, data channel 104 implements a data protection mode during the vibration at step 220. An exemplary data protection mode operates to limit, or prevent, data communication, data processing and/or data access errors within data channel 104 that may be caused by the vibration event. For example, channel 104 can actuate a data communication protection mode that includes activating a control mechanism to prevent data disruption at step 230.

Examples of a data protection mode include blocking or suspending a data communication or processing operation (i.e., a data transmit operation, a data receive operation, a data write operation, etc.) and/or implementing firmware code to modify a retry scheme within data channel 104. For example, the data protection mode can include modifying a defect sector assignment mechanism and/or implementing a specialized data read/write or data transmit/receive retry mechanism. In yet another example, the data protection mode can include implementing a log function such that the vibration event and parameters associated with the vibration event are recorded.

As discussed above, the indication at step 210 can include vibration mode information relating to a vibration event. For example, the indication can include vibration information about the vibration event such as a vibration type, vibration frequency, vibration period, vibration source, to name a few, which can be utilized to implement the data protection mode. In one embodiment, the data protection mode is selected based on the vibration information. For instance, the data protection mode can include vibration compensation, such as adjusting a data operation mode in data channel 104 based on the indicated vibration frequency.

In the context of an automotive computing system, a data protection mode can include modifying a data operation, such as modifying or disabling the transmission of data within the automotive computing system. As discussed above, an operating mode associated with an automotive computing system can include, for example, a four-wheel drive mode, an off-road driving mode, and/or a music-playing mode. In one embodiment, the transmission of signals from a sensor, such as a fuel sensor, within the automotive computing system is disabled and/or delayed based on the vibration event indication. In another embodiment, operation of a data channel or component within the automotive system, such as a GPS receiver, a cruise control feedback circuit, an airbag impact sensor, and an integrated mobile phone transmitter/receiver, can be modified based on the received vibration indication. For example, a data protection mode can include delaying or disabling an output from a cruise control feedback circuit or an airbag impact sensor. Further, a data protection mode can include modifying or delaying a response within the automotive computing system to a signal from a cruise control feedback circuit or an airbag impact sensor.

Further, in the context of a data transmission system, a data protection mode can include activating a control mechanism to reduce, or prevent, data errors and/or loss of service due to the vibration. In one example, a data transmitter and/or receiver is disabled in response to a vibration indication to reduce, or prevent, loss of data caused by the indicated vibration. In another example, a data protection mode includes delaying a data transmit and/or data receive operation to reduce, or prevent, data errors in the data transmit and/or data receive operation caused by the indicated vibration.

Further yet, in the context of a system including a data storage device, a data protection mode can include implementing a servo control function in the data storage device. Examples of a servo control function include disabling a write gate to suspend data write operations or adjusting a write fault threshold, such as a position error signal (PES) threshold. Further, a data protection mode can include implementing a data unsafe time window wherein data operations are not performed during an established time duration. Further, a servo controller can be adjusted to have high attenuation at the particular frequency of the predicted vibration. Further yet, in one embodiment the data protection mode includes switching servo controllers or implementing a servo controller mode based on the vibration indication and associated information such as vibration frequency, for example.

In another embodiment, a data protection mode can include implementing firmware code associated with a servo controller such that a read/write retry and defect mapping scheme within the data storage device is modified based on the vibration indication. For example, when encountering a large off-track signal the data protection mode can implement the firmware code to identify that the large off-track signal is due to a vibration event instead of due to a media defect. In other words, the data storage device can determine that the data sector of the media does not contain a physical defect because the indication received by the data storage device predicted the occurrence of a vibration event. Therefore, in this embodiment the firmware code can implement a read/write retry scheme to the data sector instead of implementing a defect sector assignment mechanism.

Figure 3:
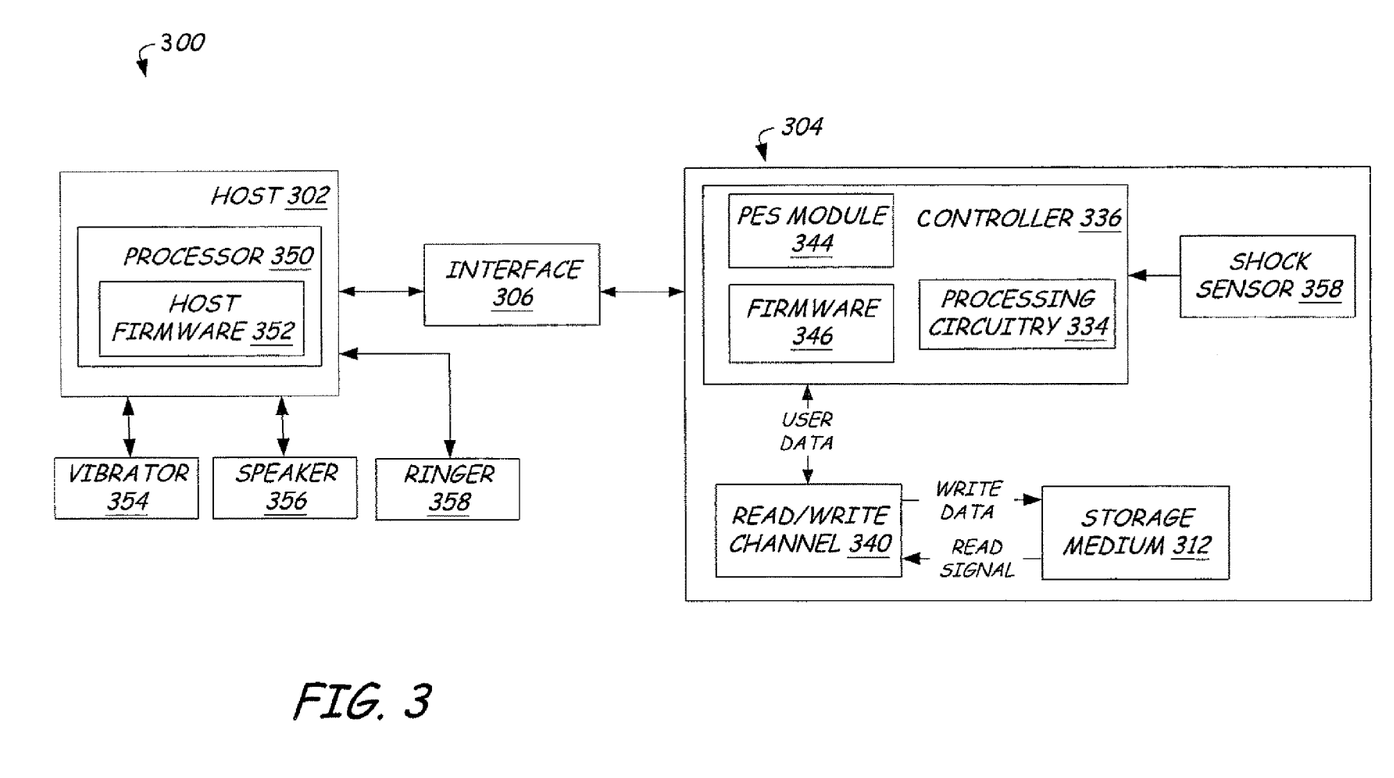
FIG. 3 is a schematic diagram of a data supported system including a data storage device.

To further illustrate implementation of a data protection mode in a data storage device, FIG. 3 illustrates a block diagram of an exemplary data supported system 300 that includes a data storage device 304 and a processor 350. Data storage device 304 can include a hard disc, floppy and/or removable disc, random access memory (RAM), magnetoresistive random access memory (MRAM), electrically erasable programmable read-only memory (EEPROM), a flash memory drive, and/or any other type of storage device to which the system 300 is connected. In one embodiment, data storage device 304 is internal to and/or physically attached to host device 302.

In this particular example, data storage device 304 is a type that can be used in hand-held consumer electronic products. For example, system 300 can be employed within an electronic device, such as, but not limited to, digital music players, mobile phones, personal data assistants, etc. In such an environment, data storage device 304 can frequently be exposed to momentary shock events due to the portability and/or functionality of hand-held devices in which it is located.

Data storage device 304 is configured to store data on a storage medium 312. Data storage device 304 and storage medium 312 will be described below in the context of a rotatable storage medium, such as one or more magnetic discs. However, it should be understood that the concepts described herein are applicable to other types of storage devices with various storage mediums. For example, storage medium 312 can comprise other types of storage media such as, but not limited to, flash memory, optical discs, RAM, EEPROM storage device, and the like.

Data storage device 304 includes processing circuitry 334, which is used for controlling various operations of data storage device 304 in a known manner with the use of programming stored in a memory. Processing circuitry 334 can communicate with host 302 through interface 306.

Data storage device 304 includes a controller 336 for controlling access to the storage medium 312 through read/write channel 340. Firmware 346 is associated with controller 336 and can include code for controlling operation of controller 336. For instance, firmware 346 can control read/write commands sent to read/write channel 340.

In the context of a rotatable storage system, controller 336 can include a servo controller and generates control signals applied to a voice coil motor and/or spindle motor (not illustrated in FIG. 3). Processing circuitry 334 instructs controller 336 to seek a read/write head (e.g., a transducer) to desired tracks of storage medium 312. An exemplary rotatable storage medium can include a single disc, or multiple discs.

Data storage device 304 can also include a preamplifier (not shown in FIG. 3) for generating a write signal applied to read/write channel 340 during a write operation, and for amplifying a read signal emanating from read/write channel 340 during a read operation. Read/write channel 340 receives data from processing circuitry 334 during a write operation and provides encoded write data to the preamplifier. During a read operation, read/write channel 340 processes a read signal generated by the preamplifier in order to detect and decode data recorded on medium 312. The decoded data is provided to processing circuitry 334 and ultimately through an interface 306 to host 302. It should be understood that the interface 306 can be of any suitable type. For example, the interface can be a standard peripheral device interface (for example, an Advanced Technology Attachment (ATA) interface between a computer system and a storage device) or the interface can be a direct connection to a network (for example, if the data storage device 304 is a standalone storage system).

Controller 336 can be responsive to servo data, such as servo burst information recorded on medium 312 in embedded servo fields or servo wedges included in the data tracks. With rotatable storage media, both track seeking and track following operations typically require generation of a position error signal (PES) which gives an indication of the radial position of the read/write head with respect to the tracks on the media. In high performance disc drives, the PES is derived from either a prerecorded servo disc with a corresponding servo head (a dedicated servo system), or from servo information that is embedded on each recording surface among user data blocks at predetermined intervals (an embedded servo system). In the illustrated embodiment, the read/write channel 340 provides servo information to a PES module 344 associated with controller 336 which generates a position error signal (PES) having a magnitude that is typically equal to zero when the head is positioned over the center of the track ("on track"), and is linearly proportional to a relative off-track distance between the head and the center of the track.

As discussed above, data storage device 304 illustrated in FIG. 3 is a type of data storage device that can be used in hand-held consumer electronic products. For instance, system 300 can be a digital music player, mobile phone, personal data assistant, etc. In such an environment, data storage device 304 can frequently be exposed to momentary shock events due to the portability and/or functionality of system 300. Burst errors are types of error that data storage device 304 can experience. In particular, momentary shock is a common source of burst errors for a data storage device in a hand-held device.

Further, data storage device 304 can be exposed to sources of vibration that are associated with operation of system 300. For example, data storage device 304 can be exposed to system vibration modes associated with operation of components and/or applications within system 300. These sources of vibration can be either internal or external to system 300. For example, as illustrated in FIG. 3, system 300 can include a vibrator 354, speaker 356 and/or a ringer 358. Vibrator 354, speaker 356, and/or ringer 358 can be operably coupled to and activated by processor 350. Vibrator 354, speaker 356, and/or ringer 358 are examples of unique disturbance sources that commonly affect a portable electronic device, such as a mobile phone. For instance, in a mobile phone application, vibrator 354, speaker 356, and/or ringer 358 are sources of disturbance that can occur frequently to indicate an incoming phone call. When activated, such disturbance can cause position error when reading and/or writing to storage medium 312.

To reduce data access errors caused by disturbances such as shock and/or vibration, the position error signal (PES) generated by PES module 344 can be utilized by controller 336 to control operation of the data storage device 304. For instance, a PES threshold can be established. In one embodiment, a PES threshold is write fault threshold that corresponds to a maximum allowable off-track distance during a write operation between the write head and the center of the track to which data is being written. During a write operation, controller 336 compares the PES generated by PES module 344 to the write fault threshold. In one embodiment, controller firmware 346 contains code for establishing the write fault threshold and implementing the comparison functions. If the magnitude of the PES exceeds the established write fault threshold, controller 336 blocks (i.e., suspends), or cancels, the data write operation. In this manner, data is not written to the storage medium 312 when the generated PES exceeds the write fault threshold. Controller 336 and/or firmware 346 can further provide a write retry command to read/write channel 340, for instance when the PES falls to a level that is below the write fault threshold.

A shock detection circuit can also be provided that determines whether a disturbance (e.g., shock, vibration, etc.) exceeds a threshold amplitude. In the illustrated embodiment, a shock sensor 358 is provided and is configured to generate a shock output signal if a vibration amplitude of an observed disturbance exceeds a threshold level. Shock sensor 358 communicates the shock output signal to controller 336. Controller 336 can be configured to control operation of the data storage device 304 based on the signal from the shock sensor 358.

In a fixed threshold scheme, a fixed write fault threshold is established such that data write operations are stopped if the position error of the data head exceeds a fixed position error threshold. In this case, the fixed position error signal (PES) threshold is set to a reasonable value such that that there is neither over-protection to affect drive performance nor under-protection to affect data integrity. However, in many instances these fixed threshold schemes are not adequate to protect data integrity in the data storage device. For example, a vibration event can result in a shock/vibration amplitude that is not large enough to trigger a shock sensor. Further, in many instances a fixed threshold scheme may not adequately disable the write operation in time to prevent data write errors. For example, during a disturbance (e.g., a vibration event) it is possible that the head position error is within the fixed write fault threshold at the beginning of a servo wedge sample N, but greatly exceeds the write fault threshold at the next servo wedge sample N+1. The data written at servo sample N may be prone to data errors, as the write gate is not disabled at servo wedge sample N.

Figure 4:
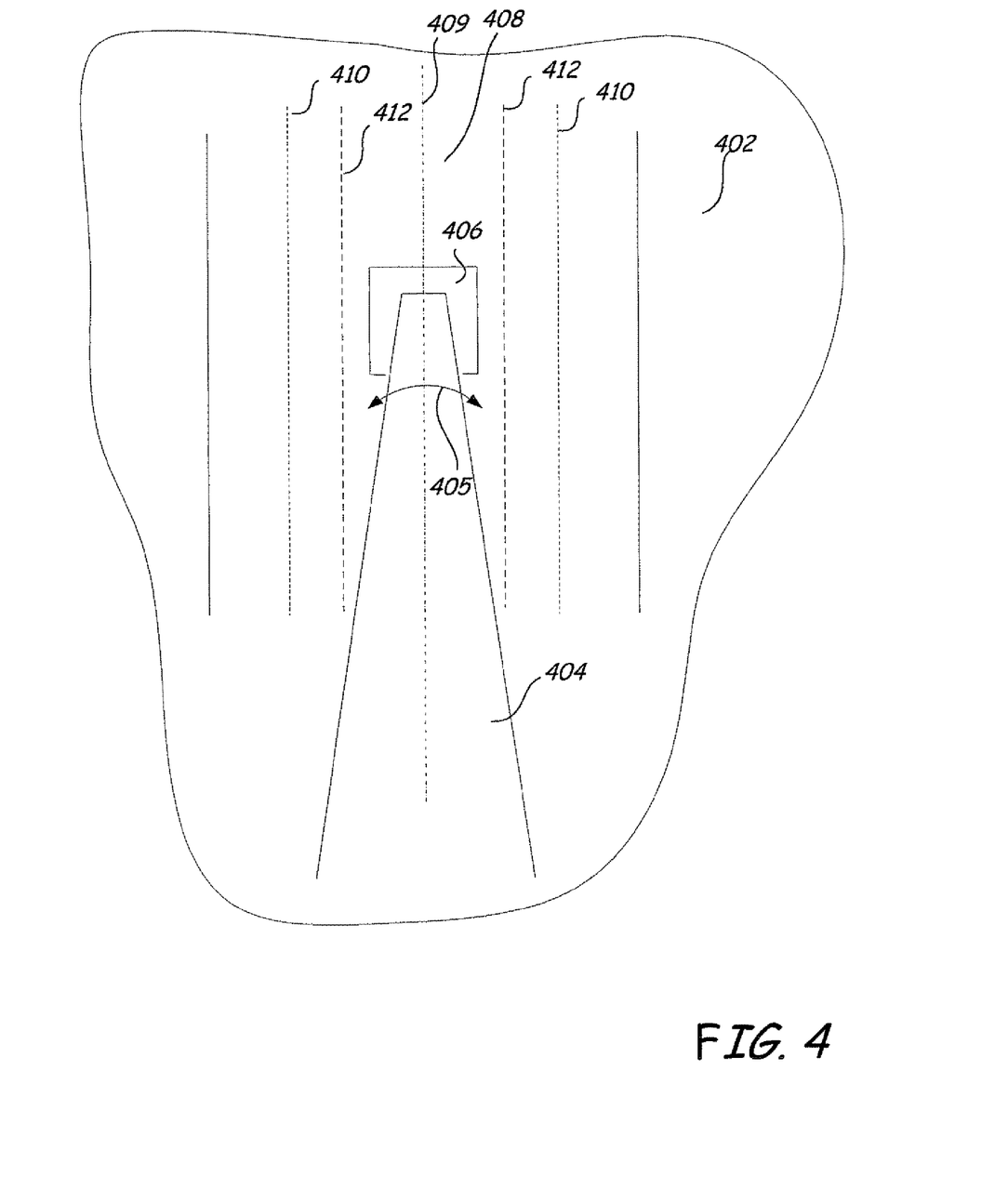
FIG. 4 is a top view of a read/write head positioned over a surface of an exemplary storage medium illustrating position error signal (PES) thresholds.

In accordance with one exemplary embodiment, a data protection mode comprising a variable PES threshold scheme can be utilized within system 300 to reduce, or prevent, data errors during a read and/or write operation of data storage device 304. To illustrate an adjusted PES threshold scheme, FIG. 4 is a top view of a surface of an exemplary storage medium 402, such as storage medium 312 illustrated in FIG. 3. FIG. 4 illustrates a head 406 (e.g., a transducer) coupled to an actuator arm 404 and positioned over a track (generally indicated by reference numeral 408) of storage medium 402. Preferably, head 406 is positioned close to the centerline 409 of the track 408 to limit position errors caused by misalignment of head 406 (i.e., offset of head 406 with respect to track 408). Disturbances such as vibration and shock can cause actuator arm 404 and head 406 to move radially with respect to track 408, such as in a direction generally indicated by arrow 405. Data write errors can increase as the radial offset of head 406 increases.

The dashed lines indicated by reference numerals 410 represent an exemplary "normal" or initial PES threshold. When the active PES threshold of the data storage device is set to the "normal" PES threshold value, the data storage device is configured to block write operations to medium 402 if the radial position of head 406 exceeds threshold 410.

The dashed lines indicated by reference numerals 412 represent an adjusted (i.e., lowered or tightened) PES threshold. When the active PES threshold of the data storage device is set to the lowered PES threshold value, the data storage device is configured to block write operations to medium 402 if the radial position of head 406 exceeds threshold 412. In comparison to "normal" PES threshold 410, the "lowered" PES threshold 412 can result in a reduced number of data errors caused by positional offset of the head 406.

Figure 5:
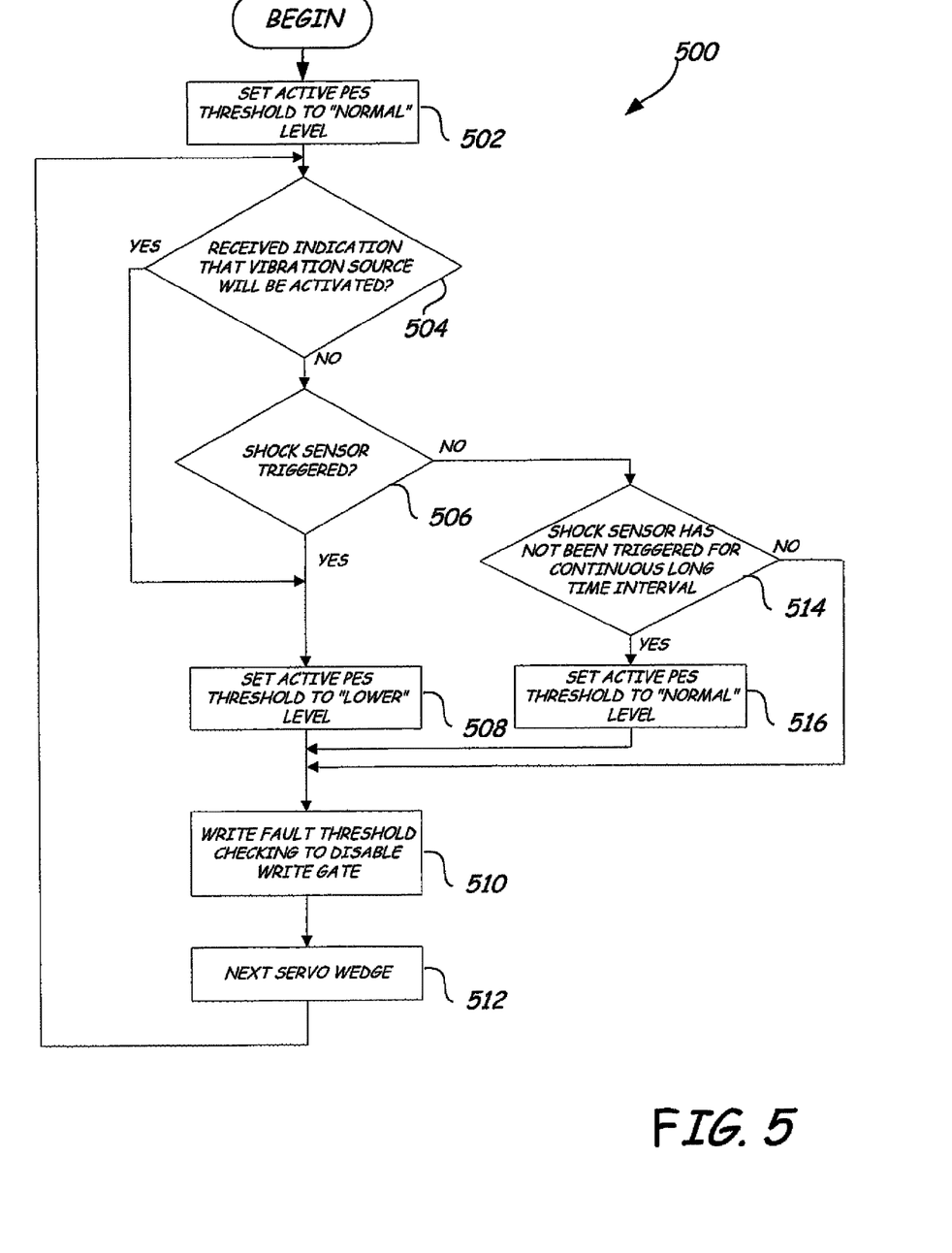
FIG. 5 is a flow diagram of a method for implementing a data protection mode in a data storage device.

FIG. 5 illustrates one embodiment of a method 500 for employing a data protection mode within a data storage device, such as data storage device 304. Method 500 is described below in the context of host 302 and data storage device 304 of FIG. 3 for illustration purposes, and is not intended to limit the scope of the concepts described herein. The concepts described with respect to method 500 are applicable to other types of systems. Further, while method 500 is described in the context of a write operation, it is noted that these concepts can be applied to other data operations, such as, but not limited to, a data read operation and a data transmit operation.

At step 502, initial operating parameters of the data storage device are established. In the illustrated embodiment, a first or "normal" PES threshold is established. Controller 336 is configured to utilize the first PES threshold to control a data operation within data storage device 304. For example, controller 336 can be configured to block (e.g., suspend) a data write operation if the PES generated by PES module 344, and corresponding to a write head writing data to storage medium 312, exceeds the first PES threshold. One example of a first PES threshold is threshold 410 illustrated in FIG. 4. It is noted that in another embodiment, step 502 can include establishing servo controller parameters such as frequency attenuation parameters, a read/write retry mechanism, and/or a defect mapping and sector reassignment scheme.

At step 504, the method determines whether an indication has been received that a vibration source will be activated. The vibration source can be a system vibration mode associated with operation of the system 300. In one embodiment, the indication is generated by host 302 and is received by controller 336 of data storage device 304 and indicates that a source of vibration (e.g., vibrator 354, speaker 356, and/or ringer 358 of host 302) is to be activated at a later instance in time. For example, the indication can indicate an incoming phone call. In this example, the indication is preferably received by data storage device 304 before activation of a disturbance source associated with the incoming call (e.g., a speaker, ringer, vibrator, etc.).

As illustrated above, in one embodiment host firmware 352 associated with processor 350 is configured to activate the vibrator 354, speaker 356, and/or ringer 358 (for example, in response to an incoming phone call). As such, host firmware 352 can have knowledge of the occurrence of a vibration event and transmit an indication of the vibration event to data storage device 304. Further, firmware 352 can include information regarding the vibration such as vibration frequency, vibration frequency range, vibration mode, vibration duration, vibration period, and the source of the vibration, to name a few. In one embodiment, in addition to receiving the indication that a vibration source will be activated, step 504 can also include receiving vibration information (e.g., vibration frequency, vibration mode, vibration duration, vibration period, etc.), regarding the vibration.

The vibration indication received at step 502 is utilized at step 504 to implement a data protection mode. For example, at step 504 servo controller parameters relating to frequency attenuation, a read/write retry mechanism, and/or a defect mapping and sector reassignment scheme can be modified based on the received vibration indication and vibration information (e.g., vibration frequency, vibration mode, vibration source, vibration duration). In the embodiment illustrated in FIG. 5, if an indication is received at step 504 the method proceeds to step 508 wherein a lowered, or "tightened" write fault threshold is set. An example of a lowered threshold is threshold 412 illustrated in FIG. 4. In one embodiment, the lowered write fault threshold corresponds to a track offset that is less than the first, or "normal", PES threshold set at step 502. Further, step 508 can include establishing a lowered write fault threshold based on received vibration information such as, but not limited to, vibration frequency, vibration mode, vibration duration, vibration period, and source of vibration. In one example, one of a plurality of "lowered" thresholds can be set based on the vibration information. In this manner, the extent to which the write fault threshold is lowered can be a function of the vibration source, vibration frequency, vibration period, and/ or vibration duration.

If an indication is not received at step 504, the method proceeds to step 506. At step 506, it is determined whether a shock detection circuit (e.g., a shock sensor) has been triggered. For instance, step 506 can determined whether a signal has been received from shock sensor 358 that is indicative of the presence of a disturbance (e.g., a vibration having an amplitude above a threshold). If a shock sensor has been triggered, the method proceeds to step 508, discussed above. If it is determined that a shock sensor has not been triggered, the method proceeds to step 514.

At step 514, the method determines whether the shock sensor has not been triggered for a long and continuous time interval. In this manner, step 514 can determine whether the system has been without a significant shock event for a sufficiently long period of time. In some instances, a recent shock event can be indicative that another shock event is likely to occur (for example, an intermittent ringer or vibrator). If it determined at step 514 that a shock sensor has not been triggered for a long and continuous time interval, the method proceeds to step 516 wherein the write fault threshold is reset to the first, or "normal", threshold level. For instance, in one embodiment the write fault threshold is set to the first PES threshold established at step 502. Alternatively, if it is determined at step 514 that a shock sensor has been recently triggered, the write fault threshold is not reset to the first, or "normal", threshold level and the method proceeds to step 510.

At step 510, data storage device 304 utilizes the established write fault threshold to selectively disable a write gate. For example, controller 336 of data storage device 304 compares the established write fault threshold (i.e., the threshold established at steps 508 or 516) to a PES signal generated based on a radial position of the write head with respect to a center of a track of the storage medium. A write gate is disabled if the PES is greater than the established write fault threshold. Disabling the write gate blocks or suspends data write operations to the storage medium such that data is not written to the storage medium when the position error of the data head exceeds the threshold. The method 500 proceeds to the next servo sector at step 512.

Figure 6:
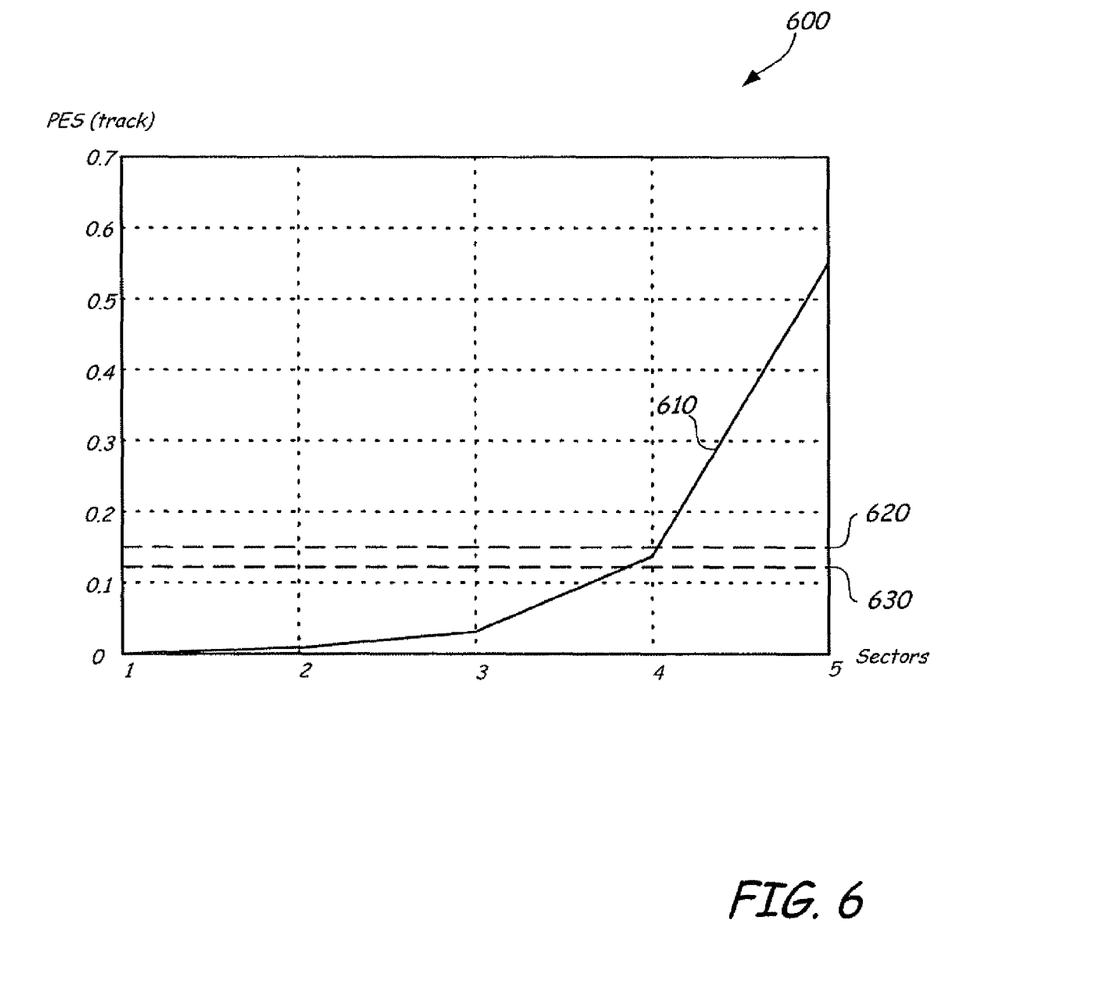
FIG. 6 is a graph illustrating an exemplary position error signal (PES).

To further illustrate a variable threshold scheme, FIG. 6 is a graph 600 illustrating an exemplary position error signal (PES) 610. The horizontal axis of graph 600 represents sectors of a data storage medium (for instance, medium 312 illustrated in FIG. 3) and the vertical axis of graph 600 represents a position error signal (PES) (in percentage off-track) as a function of the radial position of the read/write head with respect to the center of a track on the data storage medium. FIG. 6 further illustrates a first PES threshold 620, such as threshold 410 illustrated in FIG. 4. As illustrated, first PES threshold 620 corresponds to an off-track percentage of approximately 15%. It is noted that PES threshold 620 is provided for illustration purposes; any suitable threshold value can be utilized. For instance, in one embodiment PES threshold 620 is less than 15% (for example, 12%, 10%, 5%, etc.). In another embodiment, PES threshold 620 is greater than 15% (for example, 20%, 30%, 40%, etc.).

FIG. 6 also illustrates a second PES threshold 630, such as threshold 412 illustrated in FIG. 4. As illustrated, second PES threshold 630 is a lowered, or "tightened" threshold and corresponds to an off-track percentage of approximately 12%. Again, it is noted that PES threshold 630 is provided for illustration purposes; any suitable threshold value can be utilized. For instance, in one embodiment PES threshold 630 is less than 12% (for example, 10%, 5%, etc.). In another embodiment, PES threshold 630 is greater than 12% (for example, 15%, 20%, etc.).

As illustrated, the exemplary PES 610 has a magnitude below the "normal" PES threshold 620 in sectors 1, 2, 3, and at the beginning of sector 4. Thus, in the illustrated example, implementing the "normal" PES threshold 620 during operation of the data storage device, a data write operation is not disabled in sectors 1-4. However, the PES 610 greatly exceeds threshold 620 during operation in sector 4. In the illustrated example, the data head is as much as 50% off-track during operation between servo sector 4 and servo sector 5. As such, data portion between servo sector 4 and servo sector 5 likely contains data integrity errors caused by position error of the head as the write operation was not promptly disabled and data was written while the PES was significantly large.

In contrast, in the illustrated example the lowered PES threshold 630 can disable the write operation at least one sector earlier as the lowered PES threshold 630 is exceeded by the PES 610 at the beginning of sector 4. Therefore there will be significantly less data integrity errors between servo sector 4 and servo sector 5.

It is noted that the PES signal and thresholds illustrated in FIG. 6 are provided for illustration and are not intended to limit the scope of the concepts described herein.

It is to be understood that even though numerous characteristics and advantages of various embodiments of the invention have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the system while maintaining substantially the same functionality without departing from the scope and spirit of the present disclosure and/or the appended claims.

What is claimed is:

1. A method of operating a data supported system, the method comprising:
   activating a component of the system having a source of vibration in association with an operating mode of the system;
   prior to activating the component, generating an indication that a vibration associated with the operating mode will occur; and
   implementing, in response to the indication, a data protection mode in the data supported system during the vibration.

2. The method of claim 1, wherein implementing a data protection mode comprises implementing a control mechanism within a data channel in the data supported system to reduce disruption of data operations in the data supported system caused by the vibration.

3. The method of claim 1, wherein generating an indication comprises generating an indication that indicates a component having a source of vibration within the data supported system will be activated at a later instant in time.

4. The method of claim 3, and further comprising:
   receiving a second indication that indicates the source of vibration has been deactivated, and in response to the second indication, deactivating the data protection mode.

5. The method of claim 3, wherein generating an indication comprises generating an indication that at least one of a speaker, a ringer, or a vibrator associated with the data supported system will be activated.

6. The method of claim 1, wherein the data supported system comprises a data storage device and wherein implementing a data protection mode comprises implementing a data write protection mode to reduce data errors caused by the vibration during a write operation of the data storage device.

7. The method of claim 6, wherein implementing a data write protection mode comprises modifying a data write retry mechanism in the data storage device based on the indication.

8. The method of claim 1, wherein the data supported system includes a data storage device having an associated position error signal (PES) threshold, and wherein implementing a data protection mode comprises adjusting the position error signal (PES) threshold in response to the indication.

9. The method of claim 1, wherein generating an indication further comprises generating an indication including information associated with the vibration including at least one of a vibration period, a source of vibration, a vibration duration, or a frequency of the vibration, and wherein implementing a data communication protection mode comprises implementing a data protection mode based on the at least one of a vibration period, a source of vibration, a vibration duration, or a frequency of vibration.

10. A system comprising:
    a host device; and
    a data channel communicatively coupled to the host device, wherein the host device is configured to transmit an indication to the data channel pertaining to an occurrence of a vibration associated with an operating mode of the system, the indication being transmitted from the host device to the data channel before the occurrence of the vibration, and wherein the data channel is configured to implement, in response to the indication, a data protection mode during the occurrence of the vibration.

11. The system of claim 10, wherein the data channel includes a data storage device comprising:
    a data storage medium;
    a head configured to read and write data to the storage medium; and
    a controller configured to perform a data operation with the head, wherein the controller is further configured to receive the indication and, in response, establish a control modification to reduce data errors due to the vibration.

12. The system of claim 11, wherein the controller is configured to establish a control modification to modify a servo controller operating mode.

13. The system of claim 12, wherein the control modification comprises establishing an adjusted PES threshold based on the indication where the adjusted PES threshold is configured to be utilized to control a data write operation within the data storage device.

14. The method of claim 12, wherein the control modification comprises modifying a data write retry mechanism in the data storage device based on the indication.

15. The system of claim 10 wherein the host device is a portable electronic device, and wherein the indication comprises an indication that at least one of a speaker, a ringer, or a vibrator is to be activated at a later instance in time.

16. The system of claim 10, and wherein the host device is communicatively coupled to the data channel through an interface, and wherein the host device is configured to communicate the indication to the data channel through the interface.

17. The system of claim 16, wherein the host device is configured to transmit vibration information to the data channel through the interface, wherein the vibration information includes at least one of a vibration source, a vibration mode, or a vibration frequency associated with the vibration.

18. A portable electronic device comprising:
    a data storage device having a storage medium configured to store data;
    a processor configured to activate a component in the electronic device having a source of vibration; and
    a controller configured to control data operations within the data storage device, wherein the controller is configured to receive from the processor an indication that a vibration within the portable electronic device will occur and, in response, implement a control mechanism associated with the data storage device during the vibration.

19. The electronic device of claim 18, wherein the indication predicts that at least one of a speaker, a ringer, or a vibrator associated with the device will be activated at a later instance in time.

20. The electronic device of claim 18, wherein the processor is configured to communicate to the data storage device vibration information associated with the vibration including at least one of a vibration frequency, a vibration source, a vibration period, or a vibration duration.

* * * * *